Feb. 20, 1934.  H. NEHLS  1,947,731
ENERGY MEASURING AND RECORDING MECHANISM
Filed Oct. 5, 1931  3 Sheets-Sheet 1
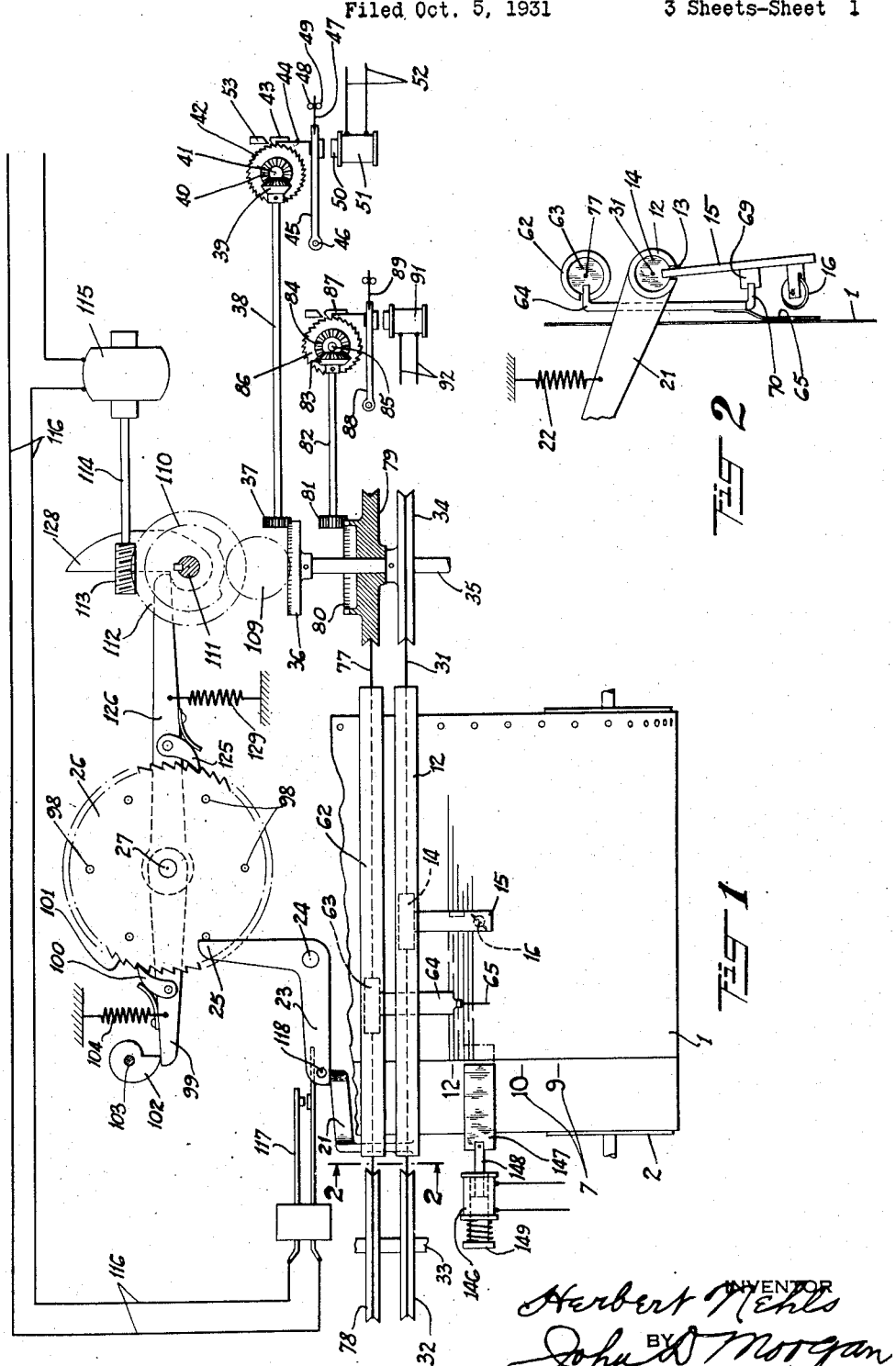

Feb. 20, 1934.    H. NEHLS    1,947,731
ENERGY MEASURING AND RECORDING MECHANISM
Filed Oct. 5, 1931    3 Sheets-Sheet 2

Herbert Nehls INVENTOR
BY John D. Morgan
ATTORNEY

Patented Feb. 20, 1934

1,947,731

UNITED STATES PATENT OFFICE 1,947,731

ENERGY MEASURING AND RECORDING MECHANISM

Herbert Nehls, Hawthorne, N. J., assignor to Landis & Gyr, A. G., a corporation of Switzerland Application October 5, 1931. Serial No. 566,905

7 Claims. (Cl. 234—5.5)

The invention relates to new and useful improvements in periodically recording energy-measuring mechanisms, and in certain of its aspects more especially to such improvements in electricity meters which make periodic records, preferably curves or graphs, of a plurality of the current components, constituting usually a representation of the actual service rendered the consumer in the successive recurrent time periods.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a diagrammatic view of a mechanism embodying the invention;

Fig. 2 is a fragmentary enlarged elevation taken on the line 2—2 of Fig. 1, looking in the direction of the arrows;

Figure 3:
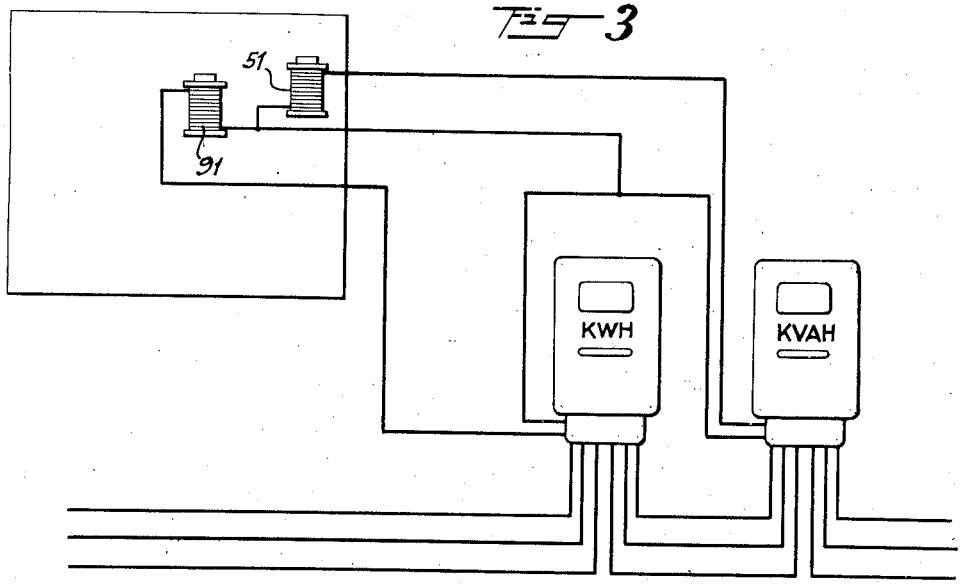
Fig. 3 is a fragmentary diagrammatic showing of the invention under the control of a kwh. and kvah. meter.

The invention provides means for metering the output of the various components of an energy supply, such as an alternating electric current, and for recording such output of said components for successive predetermined time periods; and according to certain of its aspects, the invention provides means for making a combined or unitary record of the output of the various components, the record as a whole presenting a graphic representation of the total service rendered during the recurrent time periods, and also for the continuous time covered by the record.

The invention finds one of its widest and most important applications in producing a record showing continuously the periodic demand during the successive predetermined time periods and concurrently therewith, and preferably superimposed thereon, a record of one or more components of the energy supply or output, such as the kw., kva. or rkva. The invention provides, for attaining these and other objects, mechanism which is relatively simple, reliable, and of relatively low cost. It utilizes a plurality of meters for the measurement of the desired components, and controls from these meters the record-making devices which coact together to record upon a single record sheet the output of the respective current components during the successive predetermined time periods, and usually of the actual service rendered, and likewise for the total elapsed time.

In accordance with certain features of the invention, the recording devices are positionally controlled by the respective meters, and coact to make a single unitary record upon the record sheet representing the periodic demand for each of the successive predetermined time periods, at the expiration thereof, the completed composite record presenting for successive periods and for the elapsed time continuous curves, areas, or other graphic representations of the respective metered components, and likewise of the current service rendered.

The present embodiment in its general features comprises a plurality of meters for different components of the current service rendered, one of the meters proportionally moving a marking device relatively to a time-operated, movable record-receiving sheet during the successive predetermined time periods, and mechanism for moving the marking device to the initial position at the close of each time period, and thereby marking on the record sheet a line or curve of the proper magnitude for that period, another of the meters proportionally moving another device during each of said time periods, that device co-operating with the first-mentioned marking device to produce a modification in the line or curve to indicate the magnitude of the second meter component; a unitary composite graphic representation of both magnitudes for the elapsed time period being thus made. In said embodied form the device positioned by the second meter has a shield, such as a wire, interposed into the track of the marking device to make a slight gap in the mark, and thereby indicate the second magnitude.

It will be understood that the preceding general description, and the following detailed description as well, are illustrative and exemplary but are not restrictive of the invention.

Referring now in detail to the embodiment of the invention, illustrated by way of example in the accompanying drawings, a record-receiving sheet 1 is mounted upon suitable supporting and driving devices, such as rollers 2, one of which is driven by a suitable clock mechanism in a well-known manner. The sheet usually carries time period indications, such as numbers 7, representing hours, and also abscissa lines 8 calibrated to represent current values. The present preferred form of recording mechanism is designed to produce a unitary graphic record for successive predetermined time periods, of a plurality of current or service components, the demand or utilization of the respective components for each time period being indicated by the length of a line produced on the record sheet 1 at the end of the period, and the continuous demand or utilization, and variations therein, being indicated by continuous curves or other graph indications formed by the successive lines on the record sheet.

In the diagrammatically illustrated form of recording means, the recording device controlled by one of the meters comprises a preferably rectilinear tube 12, arranged over and across the record sheet 1, said tube having a longitudinally-disposed slot 13. A piston 14 is slidable within the tube 12, and fixed thereto is an arm 15 which projects through the slot 13 and has a recording or stylus wheel 16 journalled in the end thereof. Preferably the wheel 16 is made of an alloy metal and the surface of record sheet 1 is chemically prepared, so that as the wheel moves along the sheet a linear mark is produced in a well-known manner. The tube 12 is longitudinally stationary, but has a slight rocking movement in its bearings, to cause the stylus wheel 16 to move to and from the record sheet 1. For this purpose there is fixed to one end of the tube 12 an arm 21, which is acted upon by a spring 22 which urges the stylus wheel 16 toward the record sheet 1. The end of the bent arm 21 coacts with one end of a bell crank lever 23, which is pivoted at 24, the lever pressing arm 21 to hold the wheel 16 away from the record sheet during its travel. The other end 25 of lever 23 cooperates with a disc or wheel 26, mounted on a shaft 27.

Wheel 26 governs the mechanism for making the ordinate or line record at the end of each predetermined time period, as will be later described.

Referring now to the embodied form of means whereby the piston 14 and stylus wheel 16 are moved across the record sheet, but out of engagement therewith, under the control of the particular meter, during each predetermined time period (Figs. 1 and 2), an endless cord 31 is fixed at its ends to either end of the piston 14. The cord at one side of cylinder 12 runs over a loose pulley 32, mounted on a shaft 33, and at the other side runs also over a driving pulley 34, fixed on a shaft 35. To drive these devices from a meter, fixed also on shaft 35 is a crown gear 36, with which meshes a pinion 37, fixed on a shaft 38. Fixed also on shaft 38 is a bevel gear 39, meshing with a bevel gear 40, fixed on a shaft 41. Fixed also on shaft 41 is a ratchet wheel 42, with which cooperates a pawl 43 mounted on a leaf spring 44, which in turn is mounted on a lever 45, pivoted at 46. Lever 45 has a resilient centering device, such as a leaf spring 47 fixed in the end of the lever, and passing between rods 48 and 49, but longitudinally movable under slight friction with respect thereto. On the opposite side of lever 45 is armature 50 of a magnet 51, the circuit 52 of which is controlled by a meter, as for instance a kwh. meter. A camming-out stop 53 is provided to throw pawl 43 out of ratchet wheel 42 during the retraction of the marking device while making the record at the end of the predetermined time period, as will be later described.

In the embodied form of the cooperating device for recording another component of the electrical supply, a device is provided, proportionally positionable by another meter, and adapted to interrupt the line made by the stylus wheel 16, and by such interruption to indicate the demand or output of such current component for the same time period. As embodied, a guide tube 62 is provided adjacent to the guide tube 12, and similarly disposed. Within the tube 62 is a slidable piston 63, and an arm 64 projects through a longitudinally-disposed slot in the tube, the arm 64 being bent to extend in the same direction as the arm 15. Fixed to the end of arm 64 is a wire 65, adapted to project into the path of the stylus wheel 16 to make the interruption in the record line already described. For the purpose of retracting the two devices together, lugs 69 and 70 are formed on the arms 15 and 64, respectively, and are adapted to engage during the retractive movement of the recording devices. To effect movement of this marking device proportional to its meter, an endless cord 77 has both ends attached to the ends of the piston 63. At one end of guiding tube 63, cord 77 passes over a loose pulley 78, on shaft 33, and at the other end it passes over the pulley 79, loosely mounted on shaft 35. The driving and controlling means from the corresponding meter comprises, fixed to pulley 79, a crown gear 80 with which meshes a pinion 81, fixed on a shaft 82. Fixed to the opposite end of shaft 82 is a bevel gear 83, which meshes with a bevel gear 84, which is fixed on a shaft 85. Fixed also on shaft 85 is a ratchet wheel 86. Coacting with ratchet wheel 86 is a spring-mounted pawl 87, carried on a pivoted arm 88, which also has a spring-centering device 89. This actuating mechanism for this second marking device may be the same or similar to the actuating mechanism for the first marking device, and need not be described in further detail. The magnet 91 of this device and its circuit 92 are controlled from another meter, such as a kva. meter. Each of these mechanisms, under the control of its respective meter, actuates the respective magnets 51 and 91, throughout each predetermined time period, and the two marking devices are thus progressed and positioned proportionately to the output of the corresponding current component, and at the close of each time period makes its corresponding record upon the record-receiving sheet 1.

In accordance with certain aspects of the invention, a unitary record is made of the output of all the current components, and the embodied form of mechanism for making such concurrent and unitary record comprises the disc 26 and a plurality of pins 98 projecting from the flat face thereof, these pins being adapted to engage with a tail 25 of the lever 23. The wheel 26 is moved angularly, under the control of a time mechanism, the distance between two adjacent pins 98 at the close of each succeeding predetermined time period. In the embodied form of means for effecting this, a lever 99 is loosely pivoted on shaft 27, and has a pawl 100 which engages with ratchet teeth 101 formed on the periphery of the wheel 26. Cooperating with lever 99 is a cam 102, fixed on the shaft 103 of a time-measuring mechanism, a spring 104 resiliently holding the lever to its cam.

Cooperating with the foregoing, means are provided for retracting the marking devices and making the record upon sheet 1 during such retractive movement, and in the embodied form thereof, an intermediate gear wheel 109 is in mesh with the crown gear 36, and cooperating therewith is a mutilated gear 110, fixed on a shaft 111. Fixed also on shaft 111 is a worm wheel 112, with which meshes a worm 113, fixed on shaft 114 of a motor 115. The circuit 116 of the motor has a spring-acting switch 117 which is normally open. Fixed to the lever 23 is a laterally disposed pin 118, adapted to momentarily close the switch 117, and thereby energize motor 115.

Means are provided for effecting additional angular movement of the wheel 26 to bring a succeeding pin 98 into the relation with lever 23 shown in Fig. 1, and as embodied, a lever arm 126 is loosely mounted on shaft 27, and having a spring-pressed pawl 125 engaging the ratchet teeth on wheel 26. Coacting with lever 126 is a cam 128, fixed on shaft 111, a spring 129 resiliently holding the lever to its cam.

The manner of operation of the herein-before described mechanism is substantially as follows:—

The mechanism may be regarded as in the position of Figs. 1 and 2, the two meters, through the respective magnets 51 and 91 progressing the marking devices to the right in Fig. 1, the stylus wheel 16 being out of contact with the record sheet 1. At the end of each predetermined time period, the high point of the time control cam 102 passes from the end of lever 99, the lever is then drawn upwardly by spring 104, the pin 98 in engagement with the tail 25 of lever 23 passes the lever, and spring 22 retracts lever 21. Stylus wheel 16 is thereby brought into engagement with the record sheet, and lever 23 (now free from the holding pin 98) swings upwardly, and closes the switch 17, whereby the motor 115 is energized. Shaft 111 is given one rotation by motor 115, and mutilated gear 110 engages with and rotates gear wheel 109, which rotates shaft 35 and pulley 34, and piston 14 is thereby drawn to the left in Fig. 1 back to initial position, the stylus wheel marking a line on the record sheet 1 representing the magnitude of the corresponding current component for the just elapsed time period, as measured by the meter controlling circuit 52, say a kva. meter. In its retractive marking movement, stylus wheel 16 encounters and runs over wire 65, and the marking is thus interrupted for the diameter of the wire, and thereby makes a record for the current component metered by circuit 92 from another meter, say a kw. meter. Thereafter lug 69 engages lug 70, and the two marking devices are retracted to initial position together.

To disengage the driving means for the marking devices during the retractive movement, the ratchet wheel 42 pulls pawl 43 upwardly, under the yield of spring 47, and cam 53 forces and holds pawl 43 out of engagement with the ratchet wheel 42. When the record has been made the magnet 51 draws lever 45 down and the pawl 43 again begins the forward or measuring movement of the marking device. At the end of the rotation for the marking movement, cam 128 swings lever 126 upwardly in Fig. 1, and then slips from under it, and thereupon spring 129 through pawl 125 gives a partial rotation to wheel 26 sufficient to bring the next pin 98 against the tail 25 of lever 23, rocking it slightly to the left, thereby opening switch 117, stopping meter 115, and raising stylus wheel 16 from contact with the record. That is, these parts are then in the position shown in Fig. 1 except that the marking devices are at initial position, and the cycle for the next predetermined time period is begun.

Figure 4:
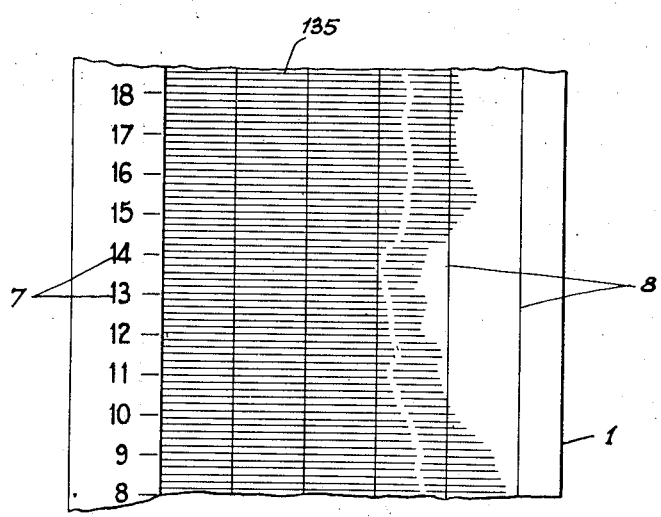
Fig. 4 shows a record sheet made by the mechanism arranged as shown in Fig. 3.

In Fig. 3 a kvah. meter is shown controlling the stylus wheel 16 and a kwh. meter controlling the pin 65. The resultant chart is shown in Fig. 4 wherein the left-hand portion 135 of the lines indicates the kw. demand, while the total length of the lines indicates the kva.

Figure 5:
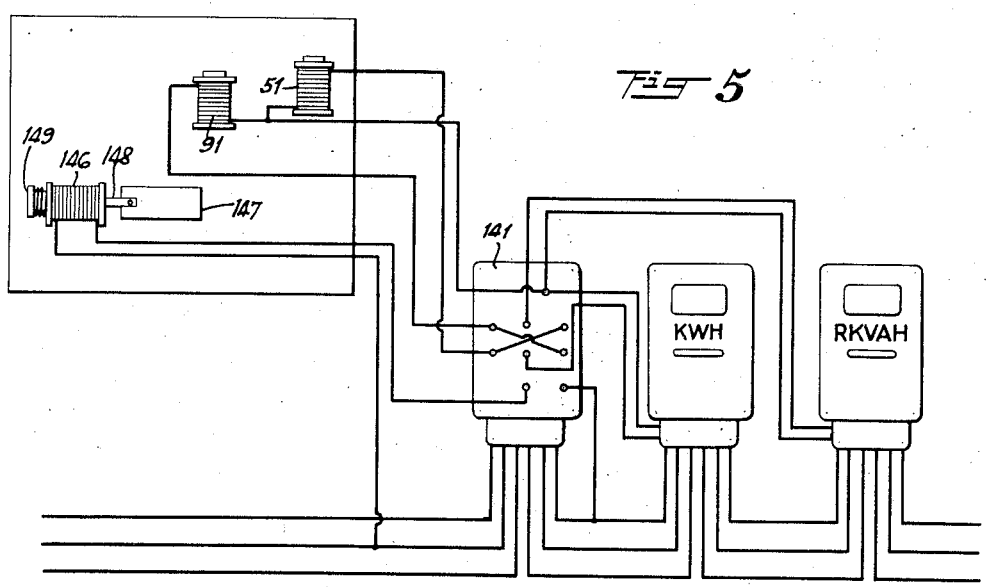
Fig. 5 is a fragmentary diagrammatic showing of the invention under the control of a kwh. meter and a rkvah. meter, with means for indicating changes in the power factor.

In Fig. 5 the record is made by a kwh. meter and a rkvah. meter. A power factor operated reversing relay 141, of any standard or other suitable form is provided for reversing the connections between the meters and the magnets 51 and 91, respectively, so that when the power factor is above 0.5, the kwh. meter controls the stylus wheel 16 and the rkvah. meter controls the wire 65. When the power factor is less than 0.5 the operation is reversed, that is, the rkvah. meter controls the stylus 16 and the kwh. meter controls the wire 65. In connection therewith an indicating device is provided which operates to produce a chart indication of the change in the power factor between above and below 0.5. For this purpose, a solenoid 146 is provided having a shutter or interponent 147, fixed to a stem 148 extending from the solenoid core 149. The shutter 147 is adapted to pass into and out of registry with the lower edge of the graph area, thereby shielding that area from the marking stylus, and by the blank thus formed to indicate the change in the power factor across the point indicated.

Figure 6:
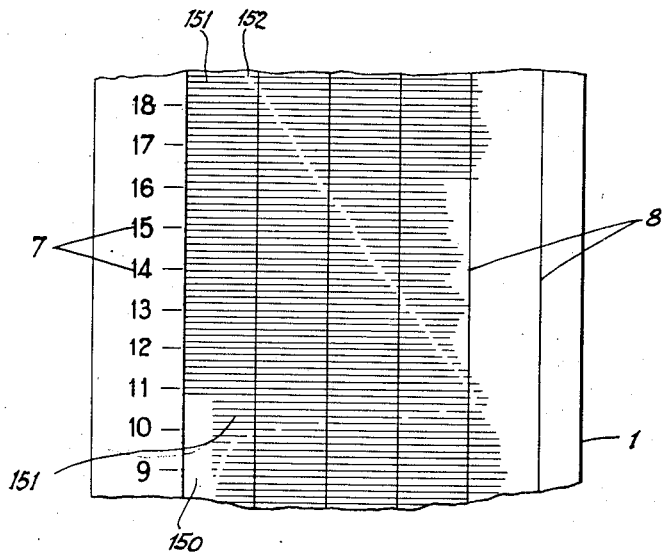
Fig. 6 shows a record sheet made by the mechanism arranged as shown in Fig. 5.

Fig. 6 shows the chart resulting from this arrangement of the mechanism. In the upper portion of the chart, above the beginning of the area 150, the left-hand portion 151 of the lines indicates the rkva., while the entire line indicates the kw. In the bottom portion of the chart, horizontally in alinement with the area 150 (which latter represents a power factor of less than 0.5), the left-hand portion 151 represents the kw. and the entire line represents the rkva. The foregoing change is indicated by the presence or absence of the clear area 150. In the chart shown in Fig. 6, the white line curve 152 indicates a power factor starting at approximately 0.9 and gradually decreasing to nearly zero.

The invention in its broader aspects is not limited to the specific mechanisms shown and described but departures may be made therefrom within the scope of the accompanying claims without departing from the principles of the invention and without sacrificing its chief advantages.

What I claim is:—

1. An energy metering and recording mechanism including in combination devices for measuring different energy components, a marking device controlled by one measuring device, a device for interrupting said marking device controlled by another measuring device, and means for causing said last two devices to coact to produce a record of the consumption of said components during an elapsed period of time.

2. A recording meter including in combination devices for measuring different quantities, a marking device controlled by one measuring device, a device for interrupting said marking device controlled by another measuring device, and means for causing said last two devices to coact to produce a graphical record of the quantities measured during an elapsed period of time and means for varying the recording action to indicate which of the two quantities is the greater.

3. An energy metering and recording mechanism including in combination devices for measuring different energy components, a marking device controlled by one measuring device, a device for interrupting said marking device controlled by another measuring device, and means for causing said last two devices to coact to produce a linear record of the consumption of said components during an elapsed period of time and a power factor operated reversing relay for reversely connecting the marking device and interrupting device to the measuring devices.

4. An energy metering and recording mechanism including in combination a time operated record sheet, a meter for measuring an energy component, a marking device moved proportionally by the meter during a predetermined time interval, means for returning the marking device to initial position while marking the record, a meter for measuring another energy component, and a device moved proportionally by said second meter during said time interval and having a member in the path of said marking member and over which it passes during its return movement, thereby making a graphic record.

5. An energy metering and recording mechanism including in combination a time operated record sheet, a meter for measuring an energy component, a marking device moved proportionally by the meter during a predetermined time interval, means for returning the marking device to initial position while marking the record, a meter for measuring another energy component, a device moved proportionally by said second meter during said time interval and having a member in the path of said marking member and over which it passes during its return movement, thereby making a graphic record, and means for thereafter returning the last named device to initial position.

6. In an energy metering and recording mechanism the combination of a stylus to be moved over a record sheet and positioned proportionately to a metered value, and means for lifting said stylus and positioned proportionately to another metered value, whereby a record showing both values is produced.

7. In an energy metering and recording mechanism the combination of a stylus to be moved over a record sheet and positioned proportionately to a metered value, means for momentarily lifting said stylus during its movement to interrupt the line made thereby, means for moving said lifting means proportionately to another value and means for lifting said stylus near the end of its movement to indicate a different series of values, whereby a record showing the several values is obtained.

HERBERT NEHLS.